3,270,667
PLANOGRAPHIC PRINTING PLATES AND
METHOD OF MAKING SAME
Glenn H. Perkins, West Peru, Main, assignor to Oxford Paper Company, Rumford, Maine, a corporation of Maine
No Drawing. Continuation of application Ser. No. 41,800, July 11, 1960. This application May 14, 1963, Ser. No. 280,440
12 Claims. (Cl. 101—149.2)

This application is a continuation of my application Serial No. 41,800, filed July 11, 1960.

This invention relates to planographic printing plates and to the method of making the same.

More particularly, the invention relates to planographic printing plates and to the method of making the same in which a coating composition consisting essentially of a pigment, deacetylated chitin, and a cross linking agent, is applied to a suitable base, and the deacetylated chitin is cross linked to form an insoluble coating thereon having a proper hydrophilic-oleophilic balance, and to such planographic printing plates and method in which an oleophilic image is applied to such coating.

Printing plates and especially planographic printing plates have been made by applying various coating compositions to a suitable base. Planographic printing plates are used to reproduce images which have been applied to the planographic surface of the plate. The image is oleophilic in nature in that it attracts oily or greasy substances and is essentially water repellent. The unimaged portion of the planographic surface is hydrophilic to the extent that it can easily be wet by water but it can also, before wetting, accept and hold an oily or greasy image. Planographic surfaces must have this hydrophilic-oleophilic balance so that the oily or greasy image can be applied thereto and the unimaged area wet by water. The planographic surface thus prepared and imaged is subject to treatment by an etch solution which prepares the plate for printing. The etch solution is repelled by the image portion of the plate but is attracted by the unimaged area. The unimaged area, therefore, is covered by a surface film of the etch solution leaving the image portion alone ink receptive.

A planographic printing plate thus prepared can operate on an offset printing press whereby the plate is alternately contacted by a roll supplying water and a roll supplying ink. After the image has been inked, it is transferred from the plate to a rubber blanket and from the blanket to the copy paper.

The image to be reproduced may be typed upon the planographic surface of the printing plate using special ribbons or employing special pencils or ball point pens as known in the art. Images can also be transferred to the paper plates of this invention by means of electrical and mechanical processes using resin powders instead of ink.

The printing plates produced according to this invention have properties superior to other known planographic printing plates as well as advantages in the process of forming the printing plates. Planographic surfaces prepared as disclosed herein produce clean copies having sharp images. The plates also possess good "stop-go" properties as well as good toning properties.

Broadly, the invention consists of forming an aqueous coating composition consisting essentially of an inorganic pigment, a deacetylated chitin, and a cross-linking agent. This aqueous coating composition is then applied in a conventional manner to the surface desired, usually a wet strength paper web, and the coating is dried, advantageously in the presence of a catalyst, to effect a cross-linking of the deacetylated chitin with the cross-linking agent to form an insoluble hydrophilic planographic surface. If necessary, heat may be employed when the coating is dried.

Deacetylated chitin, or chitosan, is a hydrophilic colloid, and may be described as a polymeric acetamino carbohydrate derivative. Chitin, occurring in its original form, is found in the shells of various crustacea such as shrimp, crab, lobster, etc., as well as in the horny exoskeleton of various insects such as beetles, locusts, grasshoppers, and the like. Chitosan can be produced from purified chitin by hydrolysis such as shown in U.S. Patent No. 2,040,879 issued May 19, 1936, and it is insoluble in water but readily soluble in dilute aqueous organic acids such as acetic, glycolic, maleic, malonic, benzoic, sulfanilic, formic, pyruvic, lactic, tartaric, adipic, sebacic citric, succinic, phthalic, fumaric, etc.

The cross-linking agent which may be used according to this invention is one which is capable of cross-linking by reacting with the reactive —OH and/or —$NH_2$ groups of the chitosan molecule. Advantageously, glyceraldehyde may be employed. However, other suitable cross-linking agents capable of reacting with the reactive —OH and/or —$NH_2$ groups of the chitosan molecule, or mixtures thereof, may also be used, such as N,N'-ethylene dimethylol cyclic urea marketed by Monsanto Chemical Company under the trade name Scriptite 45, diphenolic acid with formaldehyde, trimethylolphenol, tris(hydroxymethyl) nitromethane, urea-formaldehyde, phenolformaldehyde, melamine-formaldehyde and other amine-aldehyde compounds, glyoxal, other aldehydes, and so forth.

Inorganic pigments can be used to form the coating compositions of this invention such as silica, calcium silicate, barium sulfate, titanium dioxide, and clays such as kaolin, e.g. Lustra Clay. Lustra Clay is marketed by Southern Clay Company. The pigments may be used as a mixture if desired. A pigment comprising Lustra Clay alone or in combination with silica is preferred. When the silica and Lustra Clay are used together the ratio of clay to silica may advantageously range from about 1:1 to 4:1. A clay/silica ratio of 5:3 is preferred.

The colloidal silica which can be used to form the pigment mixture of this invention should contain silica particles of very small size. The main average size of the silica particles should be within a range of from about 7 millimicrons to about 30 millimicrons. The colloidal silicas of this size generally result in the production of planographic printing plates having improved properties. Although colloidal silicas containing silica particles of less than 7 millimicrons have not been commercially available, it is believed that the coating compositions of this invention may be advantageously prepared from colloidal silicas containing silica particles of a size even less than 7 millimicrons.

The most advantageous colloidal silicas are those which contain silica particles ranging in size from about 7 to 17 millicrons. Such colloidal silicas are marketed by E. I. du Pont de Nemours and Company under the trade names Ludox S.M., Ludox L.S., and Ludox H.S. and also by the Monsanto Chemical Company under the trade name Syton 200. The types of colloidal silicas and methods of making them are described in detail in United States Patents No. 2,244,325 issued June 3, 1941, No. 2,574,902 issued November 12, 1951, and No. 2,597,872 issued May 27, 1952. Such colloidal silicas are generally marketed as a 30% $SiO_2$ solution, but as described in the above patents the colloidal silica can be prepared containing a higher or lower percent silica. When a silica is used according to this invention, Syton 200 is preferred.

A catalyst may be added to the coating composition to promote the curing, and the catalyst may be a salt such as zinc acetate, zinc chloride, zinc phenol sulfonate, zinc sulfamate, zinc silicofluoride, and alum as well as salts of other divalent and trivalent metals, e.g. lead, calcium, manganese, cerium, lanthanum. The use of zinc acetate or zinc silicofluoride is preferred. Other suitable salts, of course, can be used. The amount of salt which which can be used can be varied widely depending upon the particular salt employed. The amount which is to be employed can be readily determined by those skilled in the art.

The coating compositions according to this invention are advantageously prepared by adding the chitosan to the pigment. Next, the cross-linking agent and the catalyst is added. The mixing may be done at room temperature and viscosity of the mixture is advantageously adjusted to about 200 centipoises, Brookfield. The pH of the coating composition can be advantageously adjusted by adding acetic acid to achieve a pH of about 4 to 5.

The coating composition may be applied to a base web or sheet by conventional apparatus, such as air knives or roll coaters. The amount of coating may vary from about 2 to 10 pounds per ream of 3300 sq. feet, with 6 to 8 pounds being most satisfactory. After coating, the stock is dried at room temperature or at normal festoon dryer temperatures (e.g., 110° F.–180° F.), to remove moisture. If necessary, the stock is then cured by exposure to temperatures of about 300° F.–350° F. for a period of 2 to 50 seconds. The coating composition is self-insolubilizing, and the components react during the drying stage to produce a practically water impervious film which possesses excellent properties of accepting and holding both water and greasy ink.

The ratio of the pigment to the chitosan may vary considerably depending upon various factors such as the particular pigment employed. The pigment/chitosan ratio may advantageously vary between between 6:1 to 3:1. A ratio of 5:1 is preferred.

The ratio of the cross-linking agent to the chitosan may also vary considerably depending upon various factors, such as the particular cross-linking agent employed. It has been found that the ratio of the cross-linking agent to the chitosan can be varied between about 10% to 100%.

The following examples illustrate the manner of producing the coating compositions and printing plates according to this invention in more detail. Parts are by weight.

Example 1

100 parts of an 8% chitosan solution were mixed with 50 parts of Lustra Clay (60% suspension) and 33.3 parts of Syton 200 (30% suspension), 8 parts of Scriptite 45, 4 parts of zinc silicofluoride, and 50 parts of water. The composition was coated on a base paper. The curing temperature was 300° F. and the curing time was 50 seconds. 1,000 copies were run and the paper showed good image and correction life.

Example 2

The procedure of Example 1 was followed except that 33.3 parts of Lustra Clay (60% suspension) and 66.6 parts of Syton 200 (30% suspension) were employed.

Example 3

125 parts of a 4% chitosan solution (in 5% acetic acid) were mixed with 26 parts of Lustra Clay (60% suspension) and 32 parts of Syton 200 (30% suspension), one part of formaldehyde (40% $CH_2O$) and 0.5 part of 4,4-bis(4-hydroxyphenol) pentanoic acid (diphenolic acid) in 75% acetic acid, 10 parts of zinc acetate (25% solution). Water was added to adjust the viscosity of the composition. The composition was coated on a base paper by the air knife method, and allowed to dry at room temperature. No high temperature cure was necessary for insolubilizing the coating. 1250 copies were run and good image, correction life and wet-rub resistance was obtained.

Example 4

173 parts of a 2.9% chitosan solution were mixed with 26 parts of Lustra Clay (60% suspension) and 32 parts of Syton 200 (30% suspension), 1.5 parts of 40% glyceraldehyde and 10 parts of zinc acetate (25% solution). The composition was coated on a base paper and allowed to dry at room temperature. The coating was completely insolubilized. The paper had very good "stop-go" properties.

Example 5

10 parts of chitosan were mixed with 31 parts of Lustra Clay (60% suspension) and 62 parts of Syton 200 (30% suspension), 3 parts of 40% glyceraldehyde, 325 parts of 5% acetic acid, and 15 parts of zinc acetate (33.3% solution). A six pound coating was applied to a base paper by the air knife method at a speed of 215' per minute. The drying temperature was 120° F. and the time in the festoon dryer was 13 minutes. The solids content of the composition was 14%. The coating was insolubilized, no further heat treatment being necessary. The coated paper showed good planographic properties.

Example 6

160 parts of a 3.1% chitoson solution (in 5% acetic acid) were mixed with 42 parts of Lustra Clay (60% suspension), 1.5 parts of 40% glyceraldehyde and 10 parts of zinc acetate (25% solution). The composition was coated on a paper base and dried at room temperature. The paper showed good wet-rub resistance, good image and clean copy after 300 runs on a press.

Example 7

143 parts of a 3.5% chitosan solution (in 2.5% acetic acid) were mixed with 50 parts of Lustra Clay (60% suspension), 2 parts of glyecraldehyde, 2.5 parts of zinc acetate, and 7 parts of water. The composition was coated on a paper base and dried at room temperature. The coated paper had good wet-rub resistance. 300 copies were run and good image and clean copy were obtained.

I claim:
1. A planographic printing plate comprising a base and a coating thereon, said coating consisting essentially of the insoluble reaction product of a composition consisting essentially of deacetylated chitin, a cross-linking agent capable of reacting with at least one of the group of reactive —OH and —$NH_2$ of the deacetylated chitin molecule, and an inorganic pigment, said coating being capable of holding both water and greasy ink.

2. The planographic printing plate of claim 1 in which the base is paper.

3. The planographic printing plate of claim 1 in which the pigment is a clay.

4. A planographic printing plate comprising a base and a coating thereon, said coating consisting essentially of the insoluble reaction product of a composition consisting essentially of deacetylated chitin, a cross-linking agent capable of reacting with at least one of the group of reactive —OH and —$NH_2$ of the deacetylated chitin molecule, and an inorganic pigment, said coating being capable of holding both water and greasy ink and having thereon an olephilic image.

5. The planographic printing plate of claim 4 in which the base is paper.

6. The planographic printing plate of claim 4 in which the pigment is clay.

7. The method of making a planographic printing plate which comprises applying to a base a coating consisting essentially of deacetylated chitin and a cross-linking agent capable of reacting with at least one of the group of reactive —OH and —NH$_2$ of the deacetylated chitin molecule, and an inorganic pigment, and drying the composition to cause components thereof to react to form an insolubilized coating on the paper base capable of holding both water and greasy ink.

8. The method of claim 7 in which the base is paper.
9. The method of claim 7 in which the pigment is clay.
10. The method of making a planographic printing plate which comprises applying to a base a coating consisting essentially of deacetylated chitin and a cross-linking agent capable of reacting with at least one of the group of reactive —OH and —NH$_2$ of the deacetylated chitin molecule and an inorganic pigment, and drying the composition to cause components thereof to react to form an insolubilized coating on the paper base capable of holding both water and greasy ink and applying an oleophilic image to said coating.
11. The method of claim 10 in which the base is paper.
12. The method of claim 10 in which the pigment is clay.

References Cited by the Examiner
UNITED STATES PATENTS

| | | | |
|---|---|---|---|
| 2,047,225 | 7/1936 | Rigby | 117—156 X |
| 2,216,845 | 10/1940 | Larson | 101—149.2 X |
| 2,311,489 | 2/1943 | Toland et al. | |
| 2,909,118 | 10/1959 | Wellcome | 101—149.2 |

DAVID KLEIN, *Primary Examiner.*
JANYCE A. BELL, *Assistant Examiner.*